United States Patent
El Khasawneh et al.

(10) Patent No.: US 12,343,869 B2
(45) Date of Patent: Jul. 1, 2025

(54) RECONFIGURABLE HYBRID KINEMATICS MACHINE

(71) Applicant: Khalifa University of Science and Technology, Abu Dhabi (AE)

(72) Inventors: Bashar El Khasawneh, Abu Dhabi (AE); Abdur Rosyid Patrum, Abu Dhabi (AE); Cesare Stefanini, Pisa (IT)

(73) Assignee: Khalifa University of Science and Technology, Abu Dhabi (AE)

( * ) Notice: Subject to any disclaimer, the term of this patent is extended or adjusted under 35 U.S.C. 154(b) by 514 days.

(21) Appl. No.: 17/830,205

(22) Filed: Jun. 1, 2022

(65) Prior Publication Data

US 2022/0402120 A1 Dec. 22, 2022

Related U.S. Application Data

(60) Provisional application No. 63/196,599, filed on Jun. 3, 2021.

(51) Int. Cl.
*B25J 9/10* (2006.01)

(52) U.S. Cl.
CPC .................................. *B25J 9/1065* (2013.01)

(58) Field of Classification Search
CPC ...... B25J 9/1065; B25J 9/0075; B25J 9/0084; B25J 9/0096; B25J 9/041; B25J 9/045; B25J 9/046; B25J 9/048; B25J 11/005; B66F 11/04
USPC .......................................................... 74/469
See application file for complete search history.

(56) References Cited

U.S. PATENT DOCUMENTS 5,697,939 A * 12/1997 Kubota et al. .......... A61B 19/00
2021/0229265 A1 * 7/2021 Xie et al. ............... B25J 9/0072

OTHER PUBLICATIONS

K.H. Hunt, Structural kinematics of in-parallel-actuated robot arms, ASME Journal of Mechanisms, Transmissions, and Automation in Design, 105 (1983), pp. 705-712.
L-W. Tsai, Kinematics of a Three-DOF Platform with Three Extensible Limbs, In: J. Lenarcic, V. P. Castelli (eds.), Recent Advances in Robot Kinematics, Springer, Dordrecht, 1996, pp. 401-410.
M. Wang, H. Liu, T. Huang, An Approach for the Lightweight Design of a 3-SPR Parallel Mechanism, ASME. Journal of Mechanisms and Robotics, 9 (5) (2017), 051016. https://doi.org/10.1115/1.4037618.
T. Huang, M. Li, X. M. Zhao, J. P. Mei, D. G. Chetwynd, S. J. Hu, Conceptual design and dimensional synthesis for a 3-DOF module of the TriVariant-a novel 5-DOF reconfigurable hybrid robot, IEEE Transactions on Robotics, 21 (3) (2005), pp. 449-456, doi: 10.1109/TRO.2004.840908.

(Continued)

*Primary Examiner* — T. Scott Fix
(74) *Attorney, Agent, or Firm* — Kilpatrick Townsend & Stockton LLP

(57) ABSTRACT

A system for machining a workpiece. The system includes a rotatable frame mounted to a base and arms which can translate relative to the rotatable frame. The arms are attached directly or indirectly to a machining tool which can be moved to various points around the workpiece and include tools for various machining operations.

14 Claims, 9 Drawing Sheets

(56) References Cited

OTHER PUBLICATIONS

Z.M. Bi, Y. Jin, Kinematic modeling of Exechon parallel kinematic machine, Robotics and Computer-Integrated Manufacturing, 27 (1) (2011), 2011, pp. 186-193, ISSN 0736-5845, https://doi.org/10.1016/j.rcim.2010.07.006.

C. Dong, H. Liu, W. Yue, T. Huang, Stiffness modeling and analysis of a novel 5-DOF hybrid robot, Mechanism and Machine Theory, 125 (2018), pp. 80-93.

H. K. Tonshoff, H. Grendel, R. Kaak, Structure and characteristics of the hybrid manipulator George V, In: C. R. Boer, L. Molinari-Tosatti, K. S. Smith (eds), Parallel Kinematic Machines, Springer-Verlag, London, 1999, pp. 365-376.

Y. Li, J. Wang, X-J. Liu, L-p. Wang, Dynamic performance comparison and counterweight optimization of two 3DOF parallel manipulators for a new hybrid machine tool, Mechanism and Machine Theory, 45 (2010), pp. 1668-1680.

M. Terrier, M. Gimènez, J-Y. Hascoët, Verne—a five-axis parallel kinematics milling machine. Proceedings of the Institution of Mechanical Engineers, Part B: Journal of Engineering Manufacture. 2005;219(3):327-336. doi: 10.1243/095440505X30177.

M. Hebsacker, T. Treib, O. Zirn, M. Honegger, Hexaglide 6 DOF and Triaglide 3 DOF Parallel Manipulators, In: Boër C.R., Molinari-Tosatti L., Smith K.S. (eds), Parallel Kinematic Machines, Advanced Manufacturing, Springer, London, 1999, https://doi.org/10.1007/978-1-4471-0885-6_24.

A. Paskhevich, P. Wenger, D. Chablat, "Kinematic and stiffness analysis of the Orthoglide, a PKM with simple, regular workspace and homogeneous performances", in International Conference on Robotics and Automation (ICRA), IEEE (2007), Rome, Italy.

S.-D. Stan, M. Manic, V. Maties, R. Balan, "Kinematics Analysis, Design, and Control of an Isoglide3 Parallel Robot (IG3PR)", in IECON 2008, The 34th Annual Conference of the IEEE Industrial Electronics Society, 2008, Orlando, USA.

C. M. Gosselin, X. Kong, S. Foucault, I. A. Bonev, "A fully decoupled 3-DOF translational parallel mechanism", Parallel Kinematic Machines International Conference, 2004, pp. 595-610, Chemnitz, Germany, Apr. 20-21, 2004.

J-M. Hervè, F. Sparacino, "Star: A New Concept in Robotics", Proceedings of the Third International Workshop on Advances in Robot Kinematics, 1992, Ferrara, Italy.

X-J Liu, J. Wang, F. Gao, L-P Wang, On the analysis of a new spatial three degrees of freedom parallel manipulator, IEEE Transactions on Robotics and Automation, 17 (6) (2001), pp. 959-968.

Z. M. Bi, L. Wang, Optimal design of reconfigurable parallel machining systems, Robotics and Computer-Integrated Manufacturing, 25 (2009), pp. 951-961.

D. Tosi, G. Legnani, N. Pedrocchi, P. Righettini, H. Giberti, Cheope: A new reconfigurable redundant manipulator, Mechanism and Machine Theory, 45 (4) (2010), pp. 611-626.

K. Wohlhart, Kinematotropic linkages, In: J. Lenarcic, V. P. Castelli (eds), Advances in Robot Kinematics, Springer, Dordrecht, 1996, pp. 359 368.

Q. Zeng, K. F. Ehmann, Design of parallel hybrid loop manipulators with kinematotropic property and deployability, Mechanism and Machine Theory, 71 (2014), pp. 1-26.

P. Grosch, R. Di Gregorio, J. López, F. Thomas, "Motion planning for a novel reconfigurable parallel manipulator with lockable revolute joints", Proceedings on 2010 IEEE International Conference on Robotics and Automation, IEEE (2010), May 3-7, 2010, Anchorage, AK, 4697 4702.

W. Ye, Y. Fang, K. Zhang, S. Guo, Mobility variation of a family of metamorphic parallel mechanisms with reconfigurable hybrid limbs, Robotics and Computer-Integrated Manufacturing, 41 (2016), pp. 145-162.

D. M. Gan, J. Dai, J. Dias, L. D. Seneviratne, Reconfigurability and unified kinematics modeling of a 3rTPS metamorphic parallel mechanism with perpendicular constraint screws, Robotics and Computer-Integrated Manufacturing, 29 (2013), pp. 121-128.

M. C. Palpacelli, L. Carbonari, G. Palmieri, M. Callegari, Analysis and Design of a Reconfigurable 3 DoF Parallel Manipulator for Multimodal Tasks, IEEE/ASME Transactions on Mechatronics, 20 (4) (2015), pp. 1975 1985.

D. M. Gan, J. Dias, L. D. Seneviratne, Unified Kinematics and Optimal Design of a 3 rRPS Metamorphic Parallel Mechanism with a Reconfigurable Revolute Joint, Mechanism and Machine Theory, 96 (part 2) (2016), pp. 239 254.

F. Aimedee, G. Gogu, J. S. Dai, C. Bouzgarrou, N. Bouton, Systematization of morphing in reconfigurable mechanisms, Mechanism and Machine Theory, 96 (Part 2) (2016), pp. 215-224.

T-F. Tang, J. Zhang, Conceptual design and comparative stiffness analysis of an Exechon-like parallel kinematic machine with lockable spherical joints, International Journal of Advanced Robotic Systems, Jul.-Aug. 2017, pp. 1-13, DOI: 10.1177/1729881417724134.

\* cited by examiner

RECONFIGURABLE HYBRID KINEMATICS MACHINE

CROSS-REFERENCES TO RELATED APPLICATIONS

This application claims the benefit of U.S. Provisional Application No. 63/196,599, filed Jun. 3, 2021, and titled "A RECONFIGURABLE HYBRID KINEMATICS MACHINE," the entire contents of which are hereby incorporated for all purposes in their entirety.

BACKGROUND OF THE INVENTION

Machining and welding of large structures can be extremely difficult, especially if the machining and welding is done in the field. The large structures can include a bridge, oil pipe, airplane wing, or any other structure that may be difficult to move to a workshop for machining or processing. Machining and welding on such structures can be done using manual methods, which can be inaccurate and can compromise the integrity and quality of the machined features. Additionally or alternatively, manual methods of machining and welding on large structures can lead to assembly and performance issues associated with the structures. Serial kinematics machines (SKMs) or parallel kinematics machines (PKMs) can be used to perform machining on large structures. However, SKMs can have joint errors, low stiffnesses at extended arm configurations, and limited dynamics. Conversely, PKMs can have limited rotational and translational workspace sizes.

BRIEF SUMMARY OF THE INVENTION

A reconfigurable machining device can include a base. The reconfigurable machining device can also include a frame having first and second portions hinged together, each of the first and second portions coupled to the base and configured to move relative to the base. The reconfigurable machining device can also include a set of arms, each arm having a proximal end coupled to the frame and a distal end coupled to a tool, the arms being coupled to the first and second portions of the frame so as to direct movement of the distal ends of the arms via hinging of the first and second portions relative to each other and movement of the first and second portions relative to the base. The reconfigurable machining device can include a platform coupled with the set of arms and a set of actuators that can be coupled with joints of the plurality of arms and being configured to move the plurality of arms. The reconfigurable machining device can include one or more actuators coupled with the platform and configured to move the tool about a workpiece. In another embodiment, a reconfigurable machining system can include a base frame and a machining device that can be coupled to the base frame. The reconfigurable machining system can include a rotatable module coupled with the base frame, the rotatable module having a mechanism that can translate and rotate relative to the base frame. The reconfigurable machining system can also include a machining module coupled with the rotatable module, the machining module configured to translate relative to the rotatable module.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
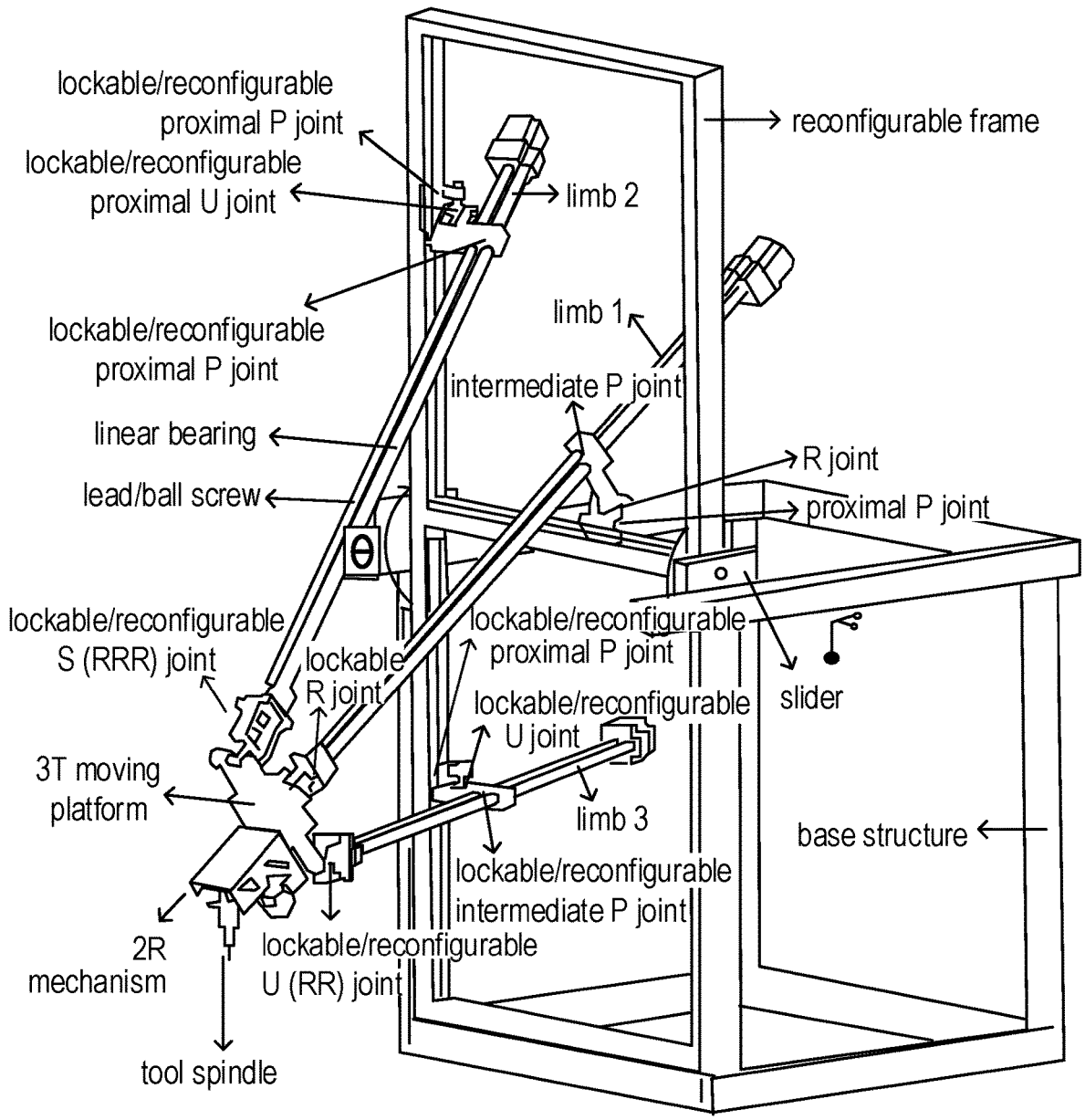
FIG. 1 is an example hybrid kinematics machine (HKM), according to various embodiments.

Embodiments and techniques described herein are directed to machining and processing systems for use with large structures. Systems for machining large structures can benefit from a good reachability and a good stiffness-to-weight ratio across its workspace to perform machining tasks with an acceptable accuracy. Serial kinematics machines (SKMs) can be used to perform machining tasks on large structures. But, the SKMs can be associated with certain technical issues such as accumulating joint errors, limited stiffnesses at extended arm configurations, and limited dynamics. Alternatively, parallel kinematics machines (PKMs), such as hexapods, can be used to perform the machining tasks on large structures. But, PKMs may have a limited translational and rotational workspace.

Hybrid kinematics machines (HKMs) consisting of parallel modules and serial modules can combine the advantages of SKMs (e.g. large workspace) and PKMs (e.g. high stiffness-to-weight ratio, non-accumulating joint errors, and high dynamics). For example, some HKMs can be five-axis HKMs which can provide three translational and two rotational degrees of freedom (DOFs) in their task space. The three translational and two rotational degrees of freedom can enable the five-axis HKM to perform five-axis machining tasks. In some examples, the HKM can include 3-DOF PKMs with linear actuators. In such examples, the linear actuators can increase the size of a workspace. In such examples, PKMs can be classified according to two categories: 1) those with active prismatic joints in the middle of the legs, i.e. active struts, and 2) those with active prismatic joints in the beginning of the legs, i.e. active sliders. In this document, the prismatic, revolute, universal, and spherical joints are indicated by P, R, U, and S, respectively. A parallelogram is indicated by (Pa).

Many of the existing HKMs using the aforementioned 3-DOF PKMs with active struts and active sliders can use serial RR links at the final position of the manipulators in addition to the 3-DOF PKMs. Some of those manipulators can use serial PP links in the beginning of the kinematic chain to provide large translational workspace. However, these machines only have a single, fixed configuration. To provide more flexibility and wider applicability, recently reconfigurable PKMs have been proposed and developed. A reconfigurable mechanism can be a mechanism which can change its configuration to attain certain kinematic properties such as mobility, workspace, or properties of the workspace. A reconfigurable mechanism can be designed for reassembly (assembly and disassembly), switching the active/passive modes of some joints, singularity passing, platform reconfiguration, joint locking, link coincidence, joint reconfiguration, or any combination thereof.

Aspects of the present disclosure are directed to a mobile and reconfigurable machining and processing system. The system can be used, for example, to machine and weld large structures in the field. In various embodiments, the system can be reconfigurable and can be adjusted based on what DOFs are needed to complete a particular task. For example, the system can have three to five DOFs and can be adjusted based on the structure that is being machined or welded.

In an illustrative example, a machining system may include a 3T2R HKM which consists of a reconfigurable 3T parallel mechanism and 2R parallel mechanism. Both the parallel mechanisms can then be connected serially, (e.g., a hybrid kinematics machine (HKM)). The reconfigurable PKMs can change their mobility by the reconfiguration or with the mobility unchanged, can change its workspace and properties of the workspace. This system can machine and process the needed feature in the field. The machine/robot can be reconfigurable, meaning, it can adjust itself based on a desired number of degrees of freedom. The machine can have three, four, or five degrees of freedom based on the requirements of what the machine will be machining or processing.

The manipulator can include five DOFs for performing a five-axis machining task. The five DOFs can be 3T2R, or in other words, can include three orthogonal translations and two rotations about two orthogonal axes. The machine can be reconfigurable to adapt to various workpiece size, geometry, machining direction and reach. The machine can be modular, and can consist of two modules that can be easily transformed to provide mobility: either 3T or 3T2R. In some examples, the modularity can also provide the machine with reconfigurability. The machine can be practical and resource-efficient to manufacture through consistent placement of the actuators. In other words, in the configurations of the machine, the placement of the actuators may not be changed. As a result, a minimum number of actuators can be used. In some examples, the proposed design can be extended or integrated with a mobile base/platform to increase its mobility.

In some examples, it may be possible to employ a parallel 3T2R mechanism or a hybrid-kinematics 3T2R mechanism. Some examples may include hybrid kinematics, which can include advantages associated with both serial kinematics topology and parallel kinematics topology as discussed earlier.

Among the available options of DOF distribution, the 3T PKM+2R SKM/PKM topology is selected. This is because it is easier to achieve the modularity which enables the transformation between 3T and 3T2R mobility. The former mobility can be achieved by dismantling the 2R mechanism from the machine. On the other hand, the latter mobility can be achieved by attaching the 2R mechanism. The HKM can be achieved by serially connecting a 3T PKM to a 2R SKM/PKM. The 3T PKM provides the 3T mobility whereas the 2R SKM/PKM provides the 2R mobility.

Furthermore, the HKM can include linear actuators for the 3T PKM mechanism, which can be either in the beginning (active sliders) or in the middle (active struts). As mentioned earlier, this is because the linear actuators can provide larger translational workspace.

The aforementioned 3T PKM+2R SKM/PKM HKM topology can include the following advantages: (i) The two modules can be clearly separated between translations and rotations. (ii) Each module may not include mixed DOFs. Hence, the Jacobian-based performance measures can be easily evaluated (and optimized). (iii) With this arrangement, we can transform the manipulator from five-axis to three-axis by removing the 2R mechanism and attaching the tool directly to the 3T mechanism.

The proposed HKM can be reconfigured into several configurations based on the type of machining required (whether it is stationary or mobile and the direction of the machining) and how the workpiece looks like. Hence, this reconfigurable machine can adapt to various machining types and workpiece shapes. FIG. 1 shows the proposed HKM at one of its configurations. The machine consists of a base structure, a reconfigurable 3T PKM, and a 2R PKM rigidly connected to the moving platform of the 3T PKM. A tool spindle is mounted on the moving platform of the 2R PKM. The reconfigurable 3T PKM can include three limbs. When none of its joints is locked, limb 1 can include a P//R⊥P⊥R joint topology in which the rotation axes of both the R joints are parallel, limb 2 can include a PUPS joint topology, and limb 3 can include a PUPU joint topology. Symbols // and ⊥ are sometimes used in this disclosure to indicate parallelism and perpendicularity between two adjacent joints, respectively.

The 3T PKM can be transformed into several configurations as shown in Table 1 and illustrated in FIGS. 2 and 3. The reconfiguration is performed by changing the angle θ, which is an angle made by the two legs of the reconfigurable frame, and changing the joint topology of the limbs by locking or reconfiguring some joints. With the goal to limit the reconfiguration to 3T mobility, the proposed reconfigurable 3T PKM can be transformed to four joint topologies, as shown in Table 1, and eight configurations, as shown in FIGS. 2 and 3. Term "orthogonal" is used in this disclosure to indicate that all the three bases of the reconfigurable 3T PKM can be perpendicular to each other. This is achieved when the angle θ is 90 degrees. When the angle θ is not 90 degrees, the configuration is called "non-orthogonal". The reconfigurable PKM can also be transformed to 3T1R topologies as shown in Table 2, but this is not the aim of the machine and hence such topologies can be excluded. The 3T1R DOF can be the highest DOF possible to be achieved by the reconfigurable PKM as limb 1 can constrain rotations about two axes.

Some examples of limb topologies can include lockable or reconfigurable joints which can include lockable/reconfigurable U joints, lockable/reconfigurable prismatic joints, or any other suitable lockable or reconfigurable joints. A lockable/reconfigurable U joint can be transformed to either a U joint or an R joint, whereas a lockable/reconfigurable S joint can be transformed to either an S joint, a U joint, or an R joint. Similarly, a lockable/reconfigurable prismatic joint can be transformed to either a prismatic joint or a fixed link, whereas a lockable/reconfigurable R joint can be transformed to either an R joint or a fixed link by locking the joint at a certain angle. In general, either lockable or reconfigurable joints can be implemented in the HKM. The HKM can include reconfigurable joints, such as reconfigurable U joints and/or reconfigurable S joints. To transform a P joint into a fixed link, one can lock the P joint at a certain link length. To lock a joint, one may use a solenoid or another type of driver to actuate the locking action.

The joint topology P//R⊥P⊥R is the joint topology of limb 1 without locking any joint degrees of freedom. Limb 1 can be transformed to a P//R⊥P joint topology by locking the distal P joint. The joint topology P//R⊥P⊥R can be achieved in limb 2 and limb 3 by locking one R joint in all the U lockable joints. The joint topology P//R⊥P⊥U of limb 2 and limb 3 can be achieved by locking one R joint in all the proximal U lockable joints. The joint topology PUU of limb 2 and limb 3 can be achieved by unlocking the U lockable joints but locking the passive intermediate P joints whereas the joint topology UPU of limb 2 and limb 3 can be achieved by unlocking the U lockable joints while locking (fixing) the passive proximal P joints.

TABLE 1

Several configurations of the reconfigurable 3T PKM

| Limb | Topology 1 | Topology 2 | Topology 3 | Topology 4 |
|---|---|---|---|---|
| 1 | P//R⊥P⊥R | P//R⊥P⊥R | P//R⊥P | P//R⊥P |
| 2 | P//R⊥P⊥R | P//R⊥P⊥R | P//R⊥P⊥U or P//R⊥PS | PUU/PUS or UPU/UPS |
| 3 | P//R⊥P⊥R | P//R⊥P⊥U | P//R⊥P⊥U | PUU or UPU |

TABLE 2

Some non-3T configurations of the reconfigurable PKM

| Limb 1 | Limb 2 | Limb 3 | Mobility |
|---|---|---|---|
| P//R⊥P⊥R | P//R⊥P⊥U or P//R⊥PS | P//R⊥P⊥U | 3T1R (X, Y, Z, and rotation about X) |
| P//R⊥P⊥R | PUU or UPU | PUU or UPU | 3T1R (X, Y, Z, and rotation about X) |

In the remainder of this document, the joint of topology of the mechanism is indicated by a number indicating the number of limbs, followed by the joint topology of the limb(s). For example, 3PRPR means that all the three limbs can have PRPR joint topology starting from the base of the limbs. For asymmetric (non-identical) joint topology of the limbs, the naming starts from limb 1, followed by limb 2 and limb 3. For example, 1PRP-1PRPS-1PRPU means that limb 1 can include a PRP joint topology, limb 2 can include a PRPS joint topology, and limb 3 can include a PRPU joint topology, whereas 2PRPR-1PRPU means that limb 1 and limb 2 have PRPR joint topology and limb 3 can include a PRPU joint topology.

Figure 2B:
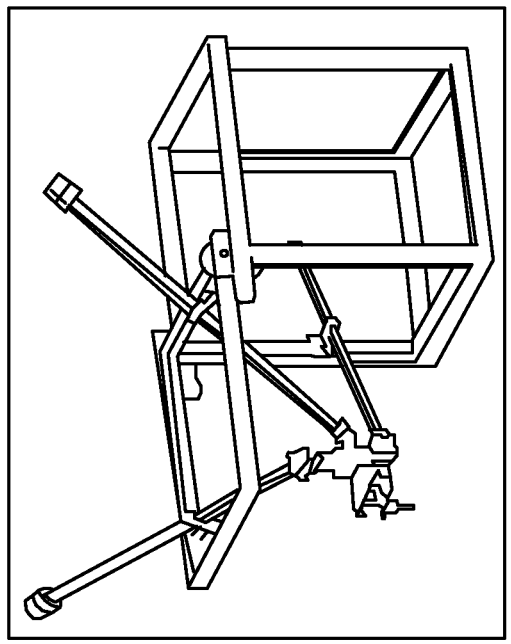
FIGS. 2A, 2B, and 2C illustrate an example HKM of FIG. 1 in various configurations.
Figure 2A:
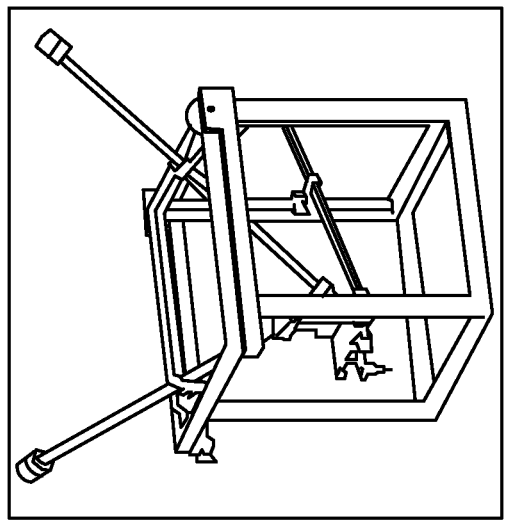

In a first topology, topology 1, the angle θ can be 90 degrees whereas the joint topology can be orthogonal 3PRPR. Either the proximal P joints or the intermediate P joints can be actuated. This joint topology can include three configurations as follow:

Configuration 1 can be a retracted, orthogonal configuration as shown in FIG. 2A. This is suitable for stationary machining inside the base structure. In other words, configuration 1 can be suitable for stationary machining with a workpiece having a size smaller than the machine volume.

Configuration 2 can involve an extended, orthogonal configuration as shown in FIG. 2B. This is suitable for mobile, front machining with limited-height workpiece. In other words, configuration 2 can be especially suitable for mobile machining with a workpiece not taller than the height of the machine. The direction of the machining can be either downward (vertical) or horizontal. These two directions can be achieved by different placements of the 2R mechanism. The former configuration is achieved by placing the 2R mechanism under the 3T moving platform so that the 2R mechanism is facing downward. The latter configuration is achieved by placing the 2R mechanism on the side of the 3T moving platform so that the 2R mechanism is facing to the front side.

Figure 2C:
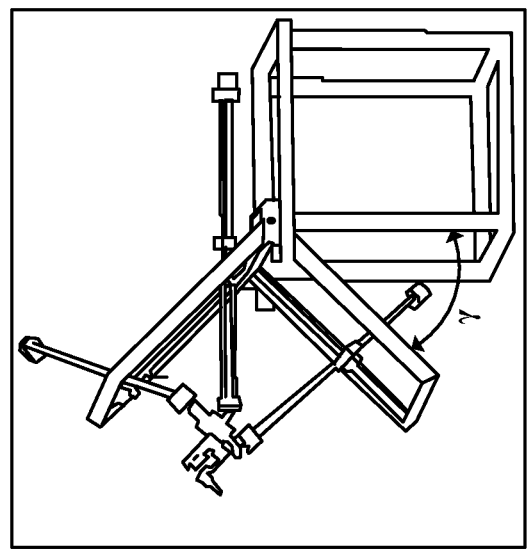

Configuration 3 can involve front machining with orthogonal configuration as shown in FIG. 2C. In this configuration, the moving frame is tilted to face to the front. As a result, this configuration is suitable for front machining in which the height of workpiece is more than the base structure of the machine.

Figure 3B:
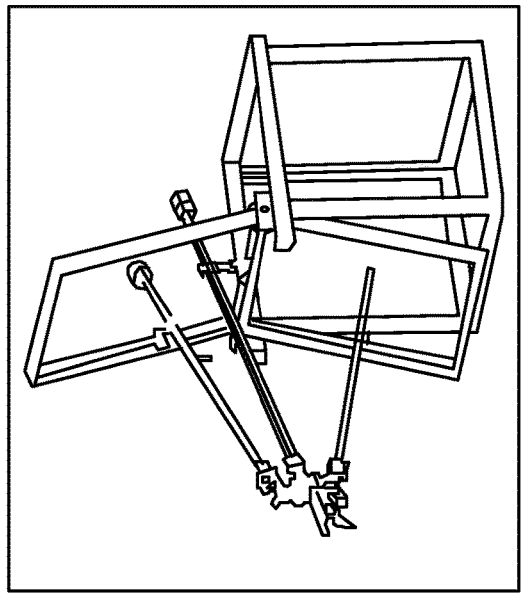
FIGS. 3A, 3B, 3C, 3D, and 3E illustrate an example of the HKM of FIG. 1 in additional configurations.
Figure 3E:
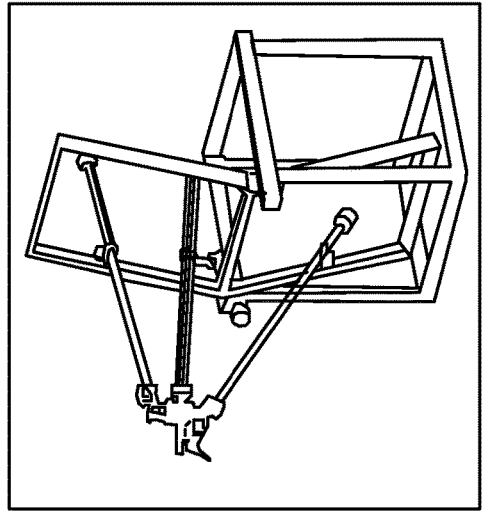
Figure 3D:
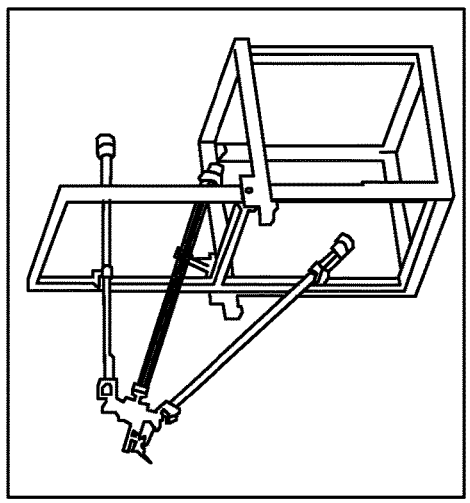
Figure 3A:
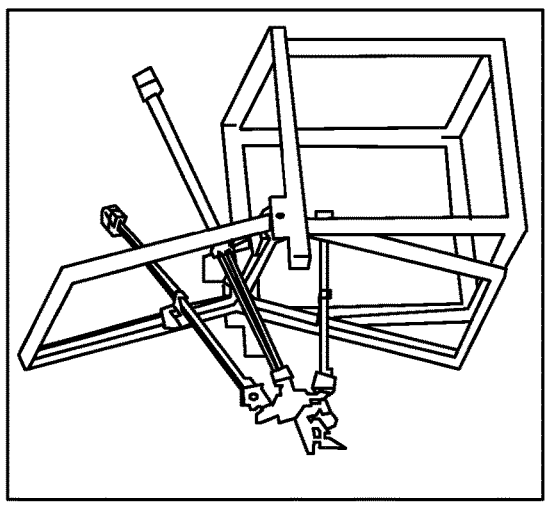

A second topology, topology 2, can be achieved by changing the angle θ to be larger than 90 degrees but less than 180 degrees, 90 degrees<θ<180 degrees, whereas the joint topology is 2PRPR-1PRPU, as shown in FIG. 3A. This configuration is called the configuration 4, which is a non-orthogonal configuration. In this configuration, either the proximal P joints or the intermediate P joints can be actuated.

A third topology, topology 3, is also achieved by changing the angle θ to be larger than 90 degrees but less than 180 degrees, 90 degrees<θ<180 degrees, whereas the joint topology is 1PRP-2PRPU or 1PRP-1PRPS-1PRPU, as shown in FIG. 3B. This configuration is called the configuration 5, which is a non-orthogonal configuration. In configuration 5, either the proximal P joints or the intermediate P joints can be actuated.

Figure 3C:
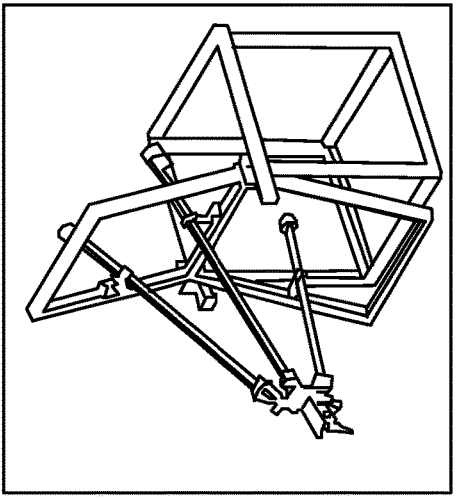

In a fourth topology, topology 4, the angle θ is either 90 degrees<θ<180 degrees, equal to 180 degrees, or more than 180 degrees. The joint topology of the limb 1 is PRP whereas the joint topology of limb 2 and limb 3 is either 2PUU/1PUS-1PUU or 2UPU/1UPS-1UPU. In the former joint topology, the proximal P joints are actuated. In the latter joint topology, the intermediate P joints can be actuated. The fourth topology can include the following three configurations:

Configuration 6 can involve front machining with non-orthogonal configuration. The angle θ can be larger than 90 degrees but less than 180 degrees. For example, θ=150 degrees, as shown in FIG. 3C. This can be suitable for mobile, front machining with tall workpiece. The workspace in the front side can be reduced by the extension of the mechanism frames.

Configuration 7 can involve front machining with non-orthogonal configuration. The angle θ can be 180 degrees as shown in FIG. 3D. This can be a T configuration as the three axes can form the letter T. This can also suitable for mobile, front machining with tall workpiece. The space in the front can be completely free. In configuration 7, if the passive prismatic joints are fixed, a motion toward the vertical base of the mechanism can be achieved by translating the active prismatic joints in a transversal direction normal to the motion direction. Given a limited span of the vertical axes, i.e. the base axes of limb 2 and limb 3, this may result in a shorter workspace in the direction normal to the vertical base.

Configuration 8 can involve front machining with non-orthogonal configuration. The angle θ is more than 180 degrees as shown in FIG. 3E. This is also suitable for front machining with tall workpiece. The space in the front can be completely free.

In the aforementioned non-orthogonal configurations, the non-orthogonality can occur between base axes of limb 2 and limb 3. Meanwhile, the base axes of both limbs remain orthogonal with respect to the base axis of limb 1.

In the aforementioned topologies, when it is indicated that a distal joint of limb 2 can be either U joint or S joint, it actually refers to either limb 2 (the upper limb) or limb 3 (the lower limb), as the designation of limb 2 and limb 3 is actually exchangeable. In other words, each of the upper limb and the lower limb can be called either limb 2 or limb 3.

Figure 4:
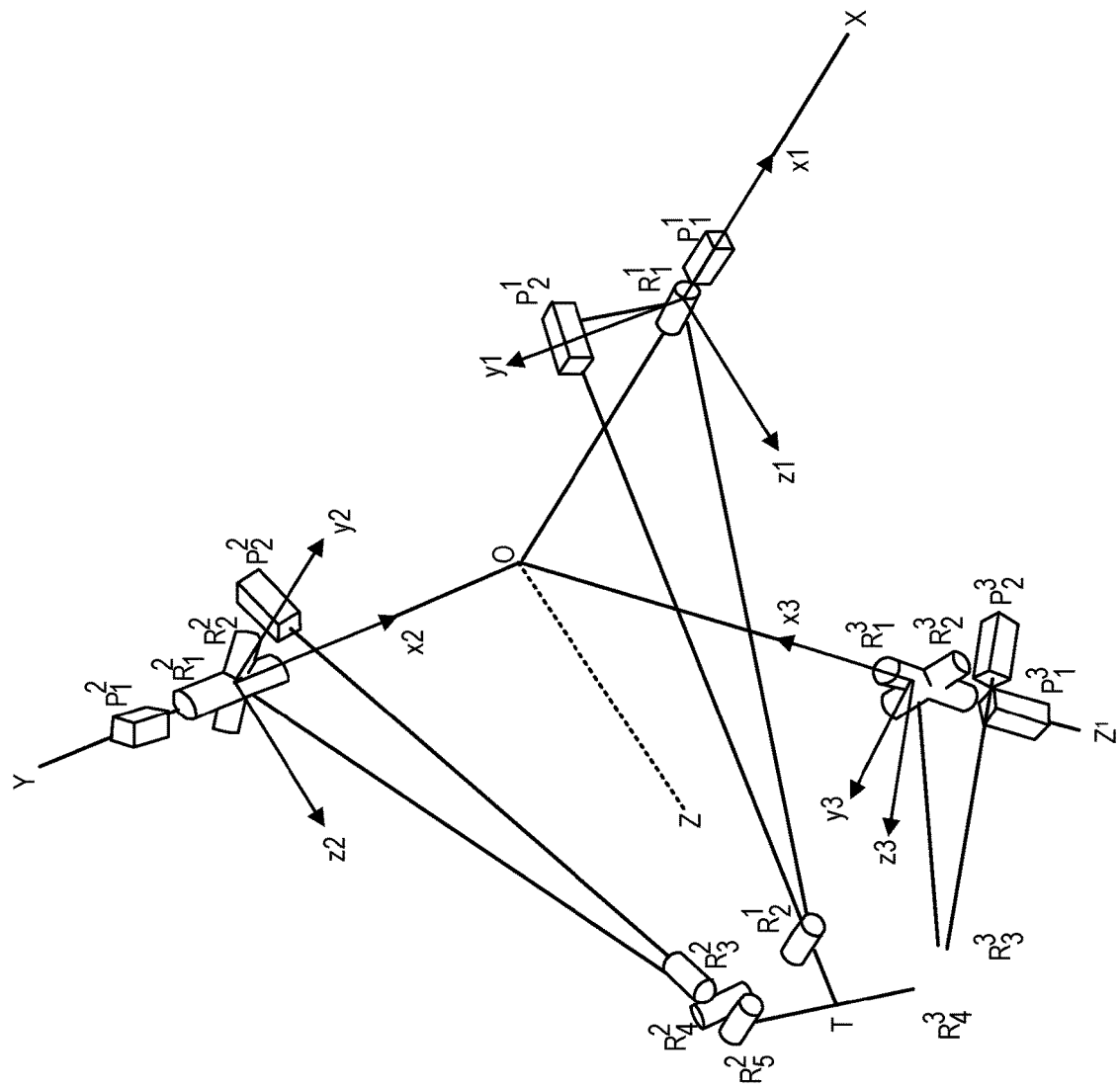
FIG. 4 shows a body frame of an example HKM of FIG. 1, according to various embodiments.

FIG. 4 shows a schematic of the general topology of the machine at a certain value of the angle θ. Beside the global coordinate X-Y-Z, local limb's coordinates are also shown in the figure. The orientation of the local limb's coordinates may not be unique, i.e. another orientation can also be used. To transform the reconfigurable 3T mechanism to any of the aforementioned topologies, certain joints can be locked/reconfigured as described above and summarized in Tables 1 and 2.

Figure 5A:
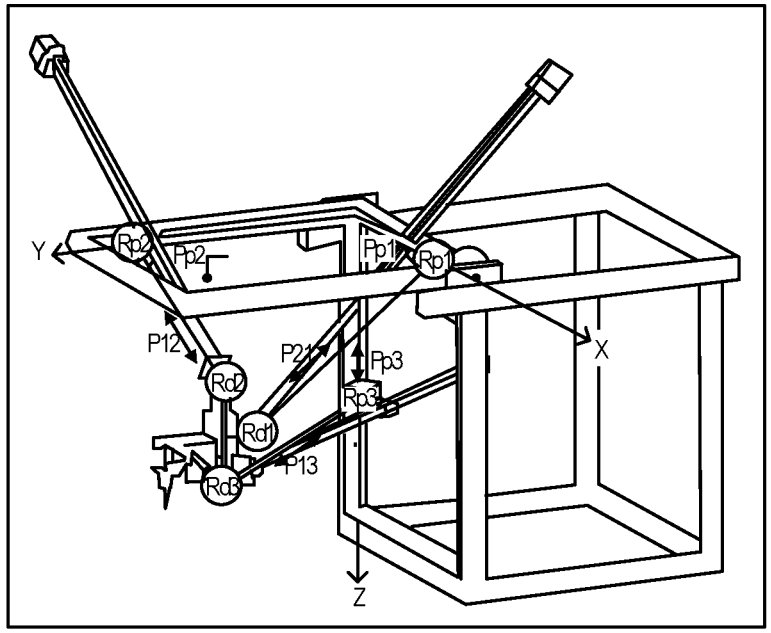
FIGS. 5A, 5B, and 5C illustrate the positions of joints of the example HKM of FIG. 1, according to various embodiments.
Figure 5B:
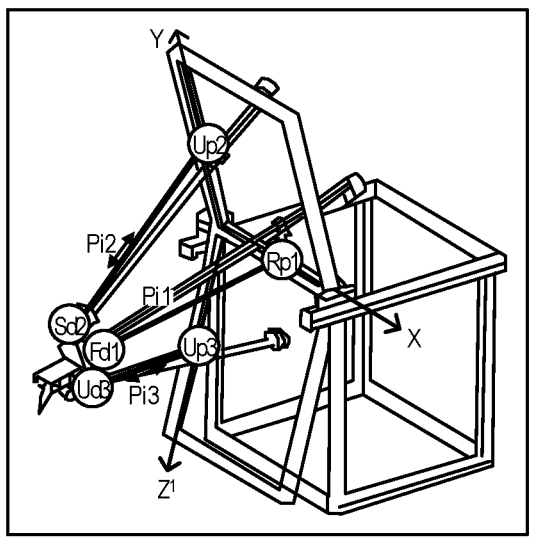
Figure 5C:
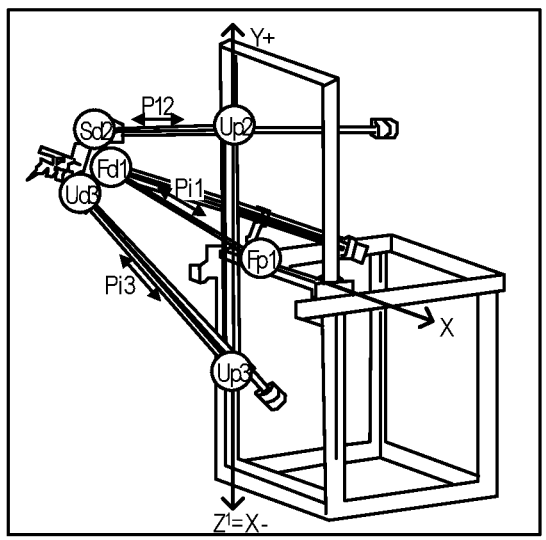

There are two options in the placement of linear actuators: 1) actuators are placed at the proximal P joints, 2) actuators are placed at the intermediate P joints. For practicality and cost efficiency, the placement of actuators across the whole configurations should be consistent. With the actuation applied to either the proximal or intermediate P joints across the whole configurations, only three actuators are required to be installed. The resulting topologies in the four architectures (with underline indicates actuated joints) are described in Table 3. Topology 4 can result in two different topologies due to different actuator placement. The limb joint topologies in the other three topologies can remain the same with the different actuator placement with only different letters being underlined which indicates the actuator placement. The illustrations of three configurations of the mechanism with actuation applied to the intermediate P joints are shown in FIGS. 5A, 5B, and 5C. The joints in the figure are indicated by capital letters R, P, U, S, and F which stand for revolute, prismatic, universal, spherical, and fixed joints, with the first subscripts p, i, or d respectively indicating proximal, intermediate, or distal, and the numerical subscripts 1, 2, and 3 indicating the limb number.

TABLE 3

Resulting configurations corresponding to two different actuator placements

| | Actuators at proximal P joints | Actuators at intermediate P joints |
|---|---|---|
| Topology 1 | 3P̱RPR | 3PRP̱R |
| Topology 2 | 2P̱RPR - 1PRP̱U | 2PRP̱R - 1P̱RPU |
| Topology 3 | 1P̱RP - 2PRP̱U<br>or 1P̱RP - 1PRP̱S - 1PRP̱U | 1PRP̱ - 2P̱RPU<br>or 1PRP̱ - 1P̱RPS - 1P̱RPU |
| Topology 4 | 1P̱RP - 2PUU<br>or 1P̱RP - 1PUS - 1PUU<br>(two intermediate P joints changed to fixed-length links) | 1PRP̱ - 2UPU<br>or 1PRP̱ - 1UPS - 1UP̱U<br>(two proximal P joints changed to fixed points) |

A 2R mechanism can be attached to the reconfigurable 3T mechanism to provide 2R mobility in addition to the 3T mobility, hence results in a five-axis 3T2R HKM. The 2R mechanism (module) can be a serial RR mechanism or any 2R parallel mechanism. The specific topology of the 2R mechanism shown in the figures in this document is only for illustrative purpose. The machine can be transformed between 3T machine and 3T2R machine through this modularity scheme, i.e. by reassembly (assembly and disassembly) of the 2R mechanism.

Figure 6:
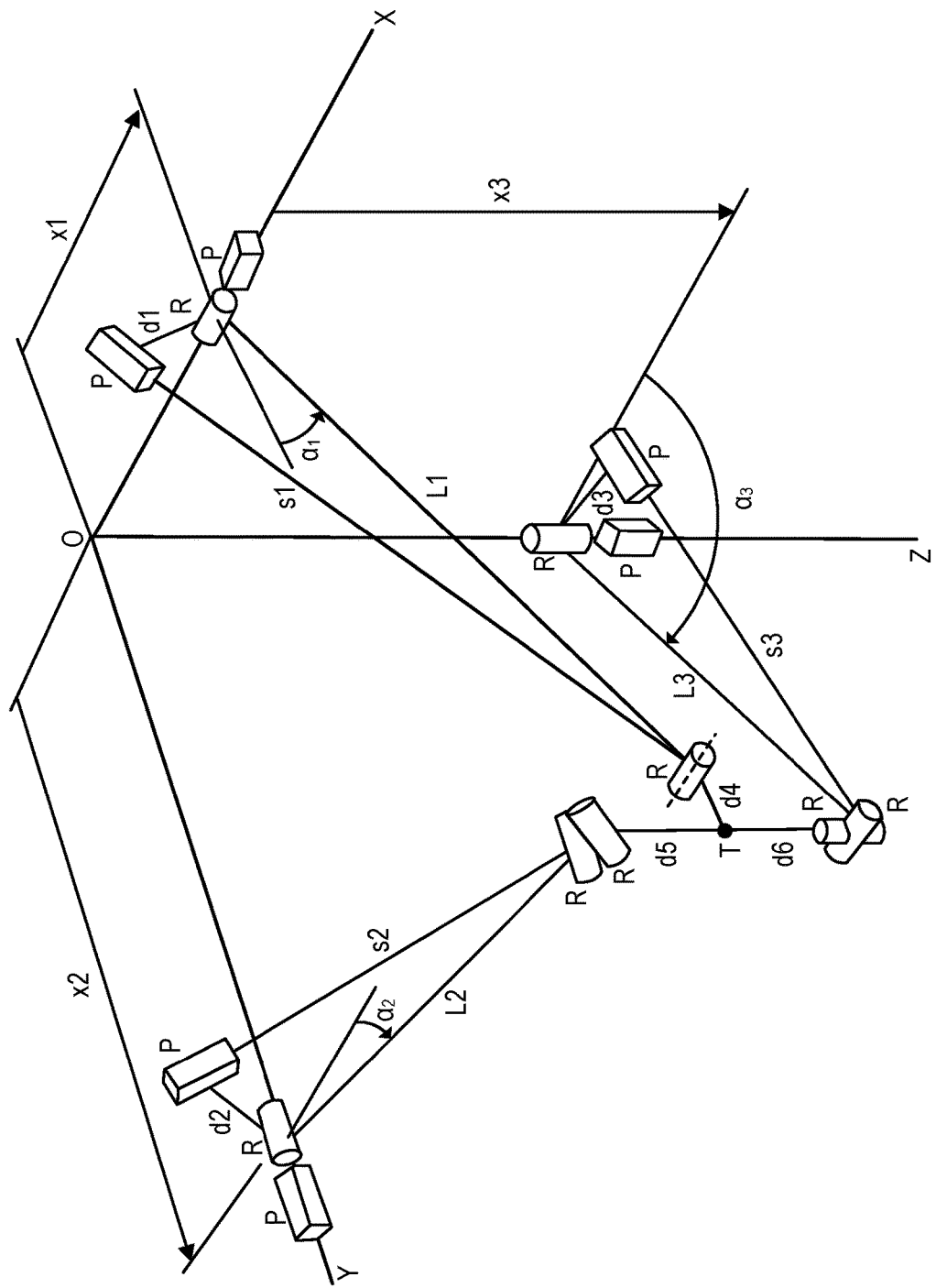
FIG. 6 is an example schematic of the example HKM of FIG. 1, in an orthogonal topology, according to various embodiments.
Figure 7:
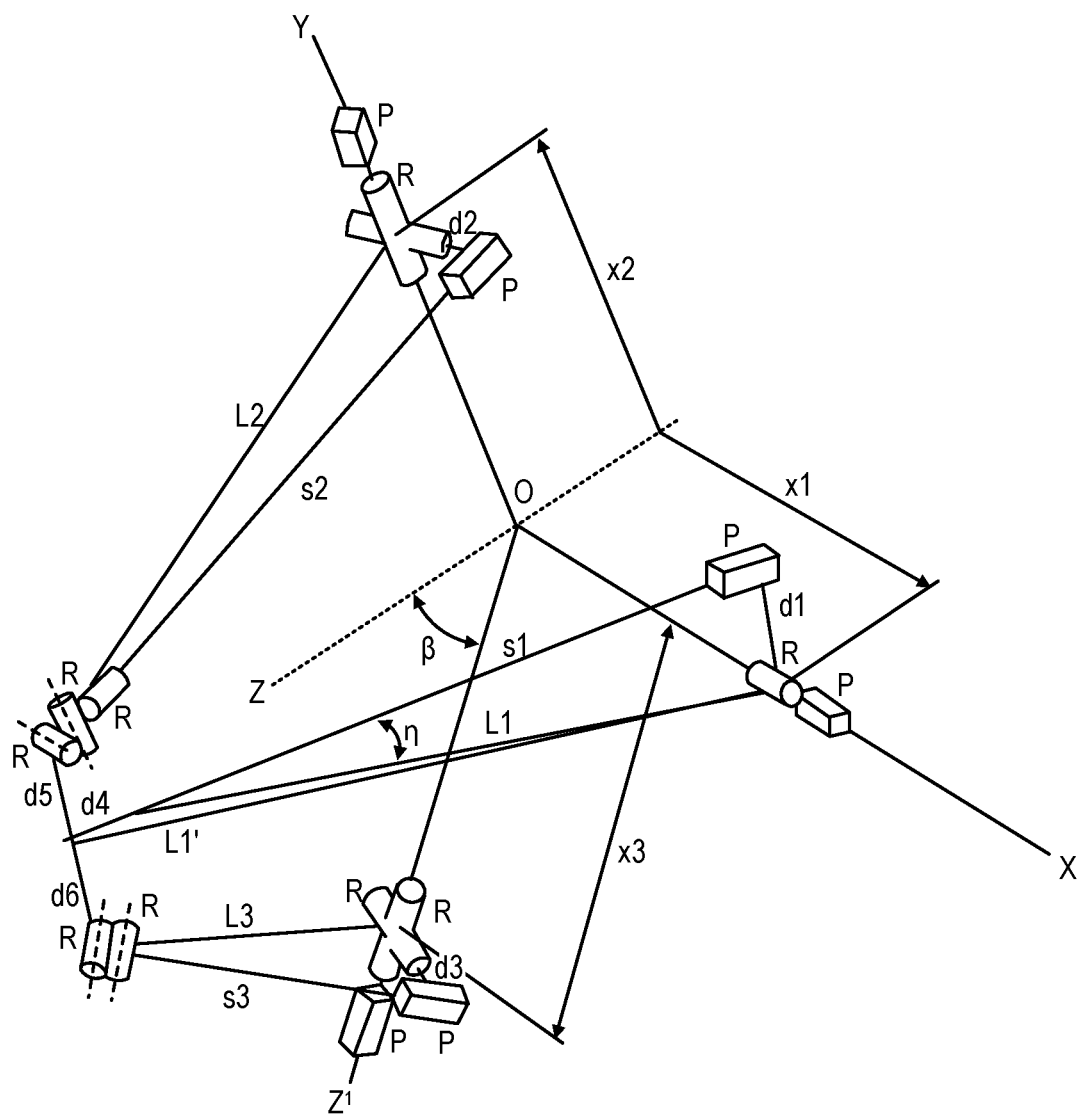
FIG. 7 is another example schematic of the example HKM of FIG. 1, in a non-orthogonal topology, according to various embodiments.

The geometric/kinematic parameters of the reconfigurable 3T PKM at its orthogonal and non-orthogonal topologies are shown in FIGS. 6 and 7, respectively. These geometric/kinematic parameters can be used in the kinematic computation and workspace plotting.

The following workspace description is mainly aimed at describing the approximate shapes of the mechanism workspace in its various topology and the effect of actuator placement to the workspace. As such, the description of the workspace is not intended to be precise or accommodate all constraints. Furthermore, the dimensions used in the workspace description should be considered as an example.

The workspace of the orthogonal 3PRPR can be theoretically as large as a box. The volume of the box can be dictated by the minimum and maximum lengths of the proximal joints of all the limbs, namely $x_{1,min}$, $x_{1,max}$, $x_{2,min}$, $x_{2,max}$, $x_{3,min}$, and $x_{3,max}$, as well as the minimum and maximum lengths of the intermediate prismatic joints, namely $L_{1,min}$, $L_{1,max}$, $L_{2,min}$, $L_{2,max}$, $L_{3,min}$, and $L_{3,max}$. Furthermore, if we prevent all the limbs to be at or near horizontal or vertical postures, the workspace can also be reduced.

Figure 8:
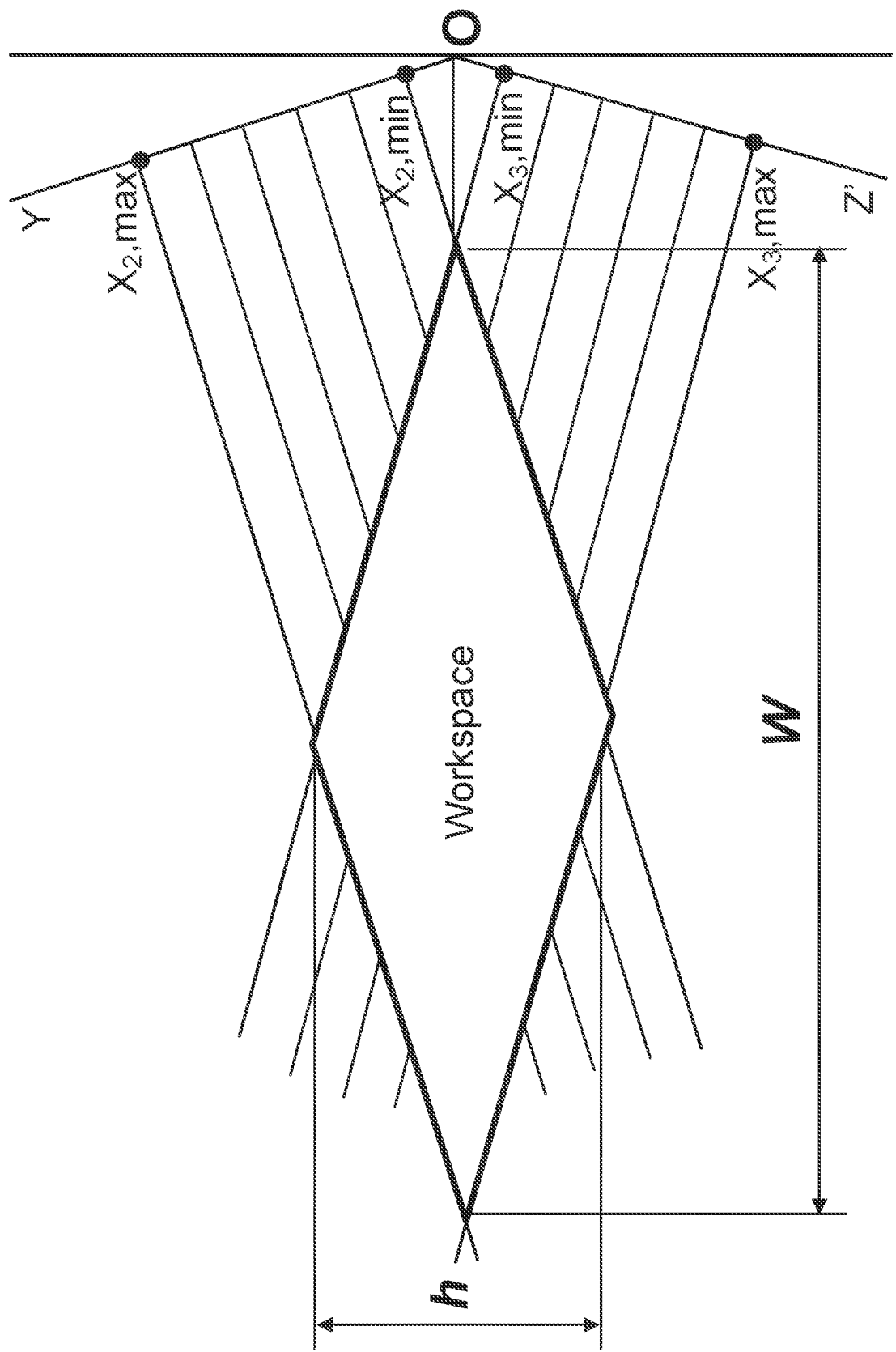
FIG. 8 is an example workspace for use with the example HKM of FIG. 1 in various topologies, according to various embodiments.
Figure 9A:
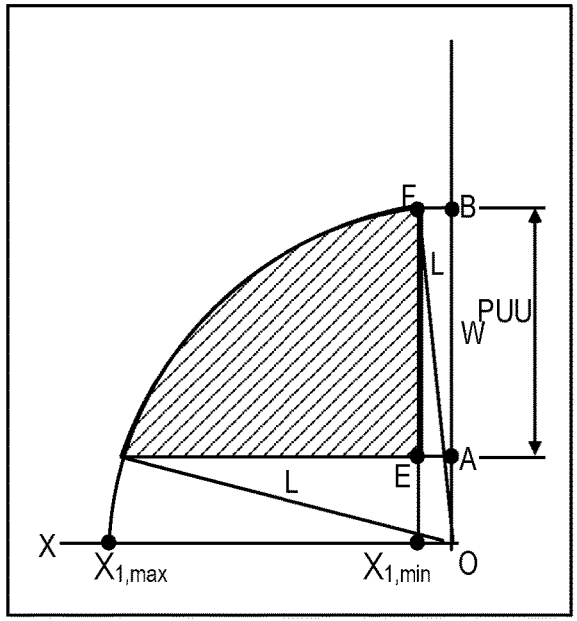
FIGS. 9A and 9B show top-views of the workspace for use with the example HKM of FIG. 1 in another topology, according to various embodiments.
Figure 9B:
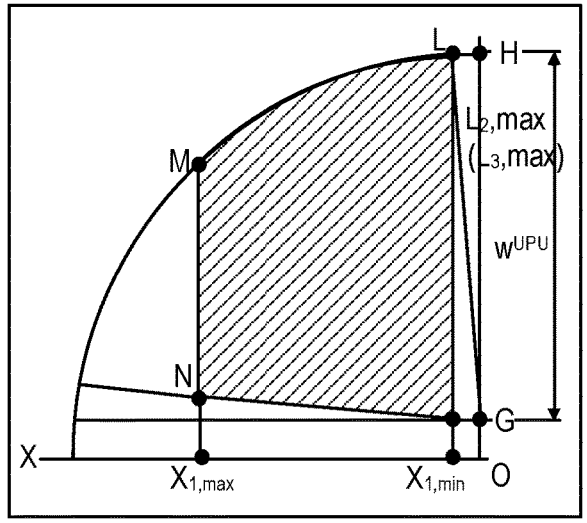
Figure 9C:
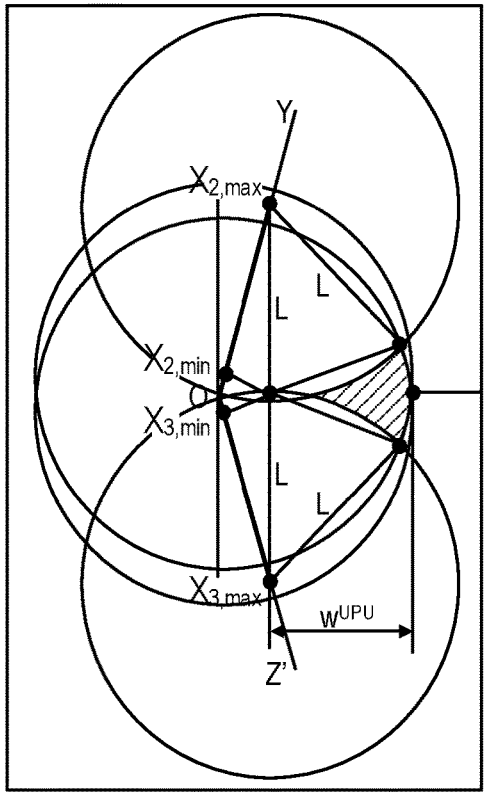
FIGS. 9C and 9D show side-views of the workspace of FIGS. 9A and 9B, respectively, according to various embodiments.
Figure 9D:
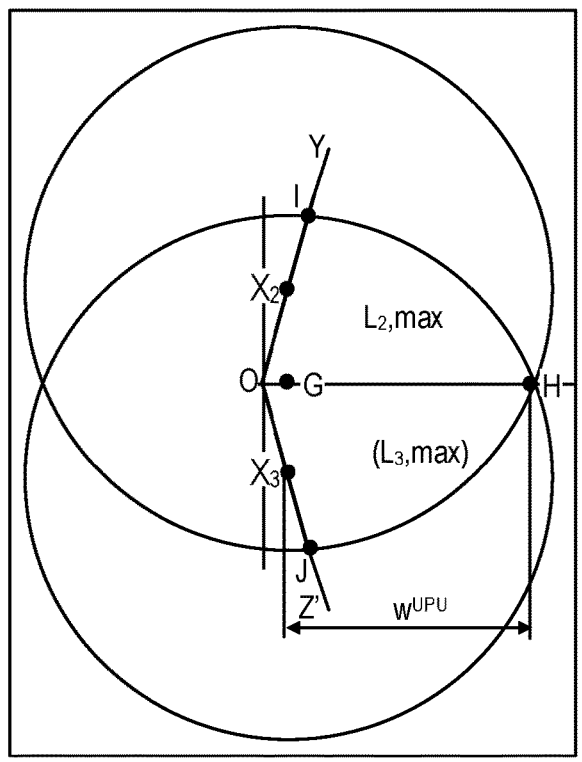

When the mechanism is transformed to a non-orthogonal 2PRPR-1PRPU and 1PRP-2PRPU (or 1PRP-1PRPS-1PRPU), the workspace can be defined by a diamond shape in the plane created by limb 2 and limb 3, extruded to the X axis direction from $x_{1,min}$ to $x_{1,max}$. The diamond shape viewed normal to the plane of limb 2 and limb 3 is depicted in FIG. 8. The aspect ratio w/h of the diamond is determined by the angle θ, whereas the area of the diamond is also dictated by the minimum and maximum lengths of both the proximal and intermediate P joints of limb 2 and limb 3. In the figure, the minimum and maximum lengths of the proximal P joints of limb 2 and limb 3 are indicated by $x_{2,min}$, $x_{2,max}$, $x_{3,min}$, and $x_{3,max}$.

When the mechanism is transformed to non-orthogonal 1PRP-2PUU (or 1PRP-1PUS-1PUU) and 1PRP-2UPU (or 1PRP-1UPS-1UPU) configurations, the resulting workspaces are shown in FIG. 9. The left-hand side of the figure, i.e. FIGS. 9A and 9C, shows the top and side views of the workspace of the 1PRP-2PUU (or 1PRP-1PUS-1PUU) configuration in which the limb length $L_1$ is variable whereas the limb lengths $L_2$ and $L_3$ are fixed at 1 m. Notice that the proximal P joints in this configuration are actuated along the X, Y, and Z' axes in the range of ($x_{1,min}$=0.1 m, $x_{1,max}$=1 m), ($x_{2,min}$=0.1 m, $x_{2,max}$=1 m), and ($x_{3,min}$=0.1 m, $x_{3,max}$=1 m), respectively. Point A is reached when the proximal P joints of limb 2 and limb 3 are at $x_{2,max}$ and $x_{3,max}$, respectively. The posture of the mechanism at point A can be a singular posture as both limbs are collinear. Point B is reached when the proximal P joints of limb 2 and limb 3 are at $x_{2,min}$ and $x_{3,min}$, respectively. At point B, limb 2 and limb 3 can be folded. For example, limb 2 and limb 3 can be almost completely folded. Both limbs can be completely folded, and hence can be at a singular posture, when their proximal P joints are at point O, i.e. $x_2$=0, $x_3$=0; however this is avoided due to nonzero values of $x_{2,min}$ and $x_{3,min}$. Point C is reached when the proximal P joint of limb 2 is at $x_{2,max}$ while that of limb 3 is at $x_{2,min}$. Point D is reached when the proximal P joint of limb 2 is at $x_{2,min}$ while that of limb 3 is at $x_{2,max}$. Due to non-zero value of $x_{1,min}$, the right boundary of the workspace shown in FIG. 9A can be shifted from $\overline{AB}$ to $\overline{EF}$. The right-hand side of FIG. 9, i.e. FIGS. 9B and 9D, shows the top and side views of the workspace of the 1PRP-2UPU (or 1PRP-1UPS-1UPU) configuration with the limb lengths $L_1$, $L_2$, and $L_3$ are varying from $L_{2,min}$=$L_{3,min}$=0 to $L_{2,max}$=$L_{3,max}$=1.4 m, as the intermediate P joints are actuated and the proximal P joints of limbs 2 and 3 are fixed at $x_2=0.5$ m, $x_3=0.5$ m. The proximal P joint of limb 1 is sliding along the X axis in the range of ($x_{1,min}=0.1$ m, $x_{1,max}=1$ m). Due to the limits $x_{1,min}$ and $x_{1,max}$, the workspace as seen in FIG. 9B is truncated along the KL and MN boundaries. Point G is considered a boundary of the workspace, as seen in FIG. 9D, and is reached when both of limb 2 and limb 3 are collinear; this is obviously a singular posture. When both of limb 2 and limb 3 are at their largest lengths, point H is reached. Point I can be reached when limb 2 is collinear with the Y axis while limb 3 is at its largest length. Similarly, point J can be reached when limb 3 is collinear with the Z' axis while limb 2 is at its largest length.

The comparison of the workspaces of all the topologies with the two actuator placements is shown in Table 4. While the actuator placement in the topologies 1, 2, and 3 do not affect the workspace of the mechanism, it was clearly shown in FIG. 9 that the placement of actuators significantly affects the workspace of topology 4. It was shown that the actuator placement at the intermediate P joints results in significantly larger workspace in the topology 4. Considering this, placing the actuators at the intermediate P joints is better in terms of the workspace, which can be optimized in a parallel mechanism.

TABLE 4

Comparison of workspace of the configurations corresponding to two different actuator placements

| | Actuators at proximal P joints | Actuators at intermediate P joints |
|---|---|---|
| Topology 1 | The same (box) | The same (box) |
| Topology 2 | The same (as all the intermediate P joints are not fixed) | The same (as all the intermediate P joints are not fixed) |
| Topology 3 | The same (as all the intermediate P joints are not fixed) | The same (as all the intermediate P joints are not fixed) |
| Topology 4 | Smaller (as shown in FIG. 9) | Larger (as shown in FIG. 9) |

The proposed machine topology can be implemented in various ways as long as the topological/geometric conditions and the mobility as described are satisfied. The various implementations can be made based on several considerations such as performance optimization. For example, a certain detailed shape of the machine components may be used in order to optimize the reliability, the strength, the stiffness, and the weight of the machine, as well as one or more stiffeners are added to the structure of the machine to enhance the stiffness of the machine. Furthermore, referring to FIG. 6 and FIG. 7, the value of the parameters $d_1$, $d_2$, and $d_3$ can be either zero or nonzero. In addition, two or three adjacent R joints which compose the distal U or S joints can be either intersecting at a point or not.

The joint types (P, R, U, S, or fixed) used in this machine are defined by its kinematic mobility, regardless of the detailed design of the joints. The term "lockable/reconfigurable joint" means either: 1) a lockable joint in which one or more of its degrees of freedom is locked (fixed), regardless of the locking mechanism, to reconfigure it to a certain joint type (defined by its mobility), or 2) a reconfigurable joint in which one of more of its degrees of freedom is constrained in any other way to reconfigure it to a certain joint type (defined by its mobility).

Although the reconfigurable PKM described here is to be maintained in its 3T mobility, one may also reconfigure the PKM to a topology with 3T1R as indicated in Table 2 for a certain purpose/application.

Although the reconfigurable frames of the PKM, i.e. the two frames aligned with Y and Z/Z' axes with an angle $\theta$ between them, and the tilting angle $\gamma$ of the whole reconfigurable frames with respect to the vertical columns of the base structure are preferred to be adjusted before a single operation setup/run, one may change the angle $\theta$ and/or the tilting angle $\gamma$ during an operation for a certain purpose, such as changing the direction, the reach, or the workspace of the mechanism.

The proposed mechanism/machine can be mounted on/integrated with a mobile base/platform to increase its mobility indoor or outdoor, mounted directly on the ground, or attached to/integrated with any structure/mechanism.

One may use only the reconfigurable 3T mechanism without any 2R mechanism attached or use the reconfigurable 3T with any 2R mechanism attached.

One may either partially or fully use/utilize the reconfigurability of the mechanism described here. For example, one may only take two or three topologies out of the four possible topologies described in the disclosure, or one may only take some configurations out of the total number of possible configurations described in the disclosure.

The proposed reconfigurable 3T PKM can be transformed to four topologies with eight configurations which are suitable for machining with various reach, workspace, and directions. Furthermore, a 2R mechanism can be serially connected to the reconfigurable 3T PKM to compose a 3T2R HKM capable of performing five-axis machining. The 2R mechanism can also be removed to make a 3T machine.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A reconfigurable machining device, comprising:
   a base;
   a frame having first and second portions hinged together at a third portion, each of the first and second portions coupled to the base and configured to move relative to the base, wherein the first and second portions are configured to rotate relative to the third portion, the third portion being configured to translate the frame along the base;
   a plurality of arms, each of the plurality of arms having a proximal end coupled to the frame and a distal end coupled to a tool, wherein the plurality of arms coupled to the first and second portions of the frame are configured to direct movement of the distal ends of the plurality of arms via hinging of the first and second portions relative to each other and movement of the first and second portions relative to the base;
   a platform coupled with the plurality of arms;
   a plurality of actuators coupled with joints of the plurality of arms and being configured to move the plurality of arms, and
   one or more actuators coupled with the platform and configured to move the tool about a workpiece.

2. The reconfigurable machining device of claim 1, wherein the plurality of arms coupled to the frame utilize locking or reconfigurable joints.

3. The reconfigurable machining device of claim 2, wherein the joints are moveable relative to the frame and the plurality of arms.

4. The reconfigurable machining device of claim 2, wherein the joints are coupled with the platform, the arms, the frame, or motors configured to move the joints.

5. The reconfigurable machining device of claim 1, wherein the plurality of arms are moveable between a first position and a second position to move the tool about the workpiece.

6. The reconfigurable machining device of claim 1, wherein the plurality of actuators comprise linear actuators.

7. A reconfigurable machining system, comprising:
   a base frame; and
   a machining device coupled to the base frame and comprising:
      a rotatable module coupled with the base frame, the rotatable module comprising first and second portions hinged together at a third portion, each of the first and second portions coupled to the base frame and configured to move relative to the base frame, wherein the first and second portions are configured to rotate relative to the third portion, the third portion being configured to translate the frame along the base frame; and
      a machining module coupled with the rotatable module, the machining module configured to translate relative to the rotatable module.

8. The reconfigurable machining system of claim 7, wherein the machining module comprises a machining tool and arms coupling the machining tool to the rotatable module, the machining tool comprising one or more tools for machining a workpiece.

9. The reconfigurable machining system of claim 8, wherein the arms are moveable between a first position and a second position to move the machining tool about the workpiece.

10. The reconfigurable machining system of claim 9, wherein the machining module further comprises actuators configured to move the arms between the first position and the second position.

11. The reconfigurable machining system of claim 7, wherein the machining module comprises a lockable joint or a reconfigurable joint.

12. The reconfigurable machining system of claim 7, wherein the base frame is moveable between a first position and a second position around a workpiece.

13. The reconfigurable machining system of claim 7, wherein the machining device comprises at least one of: a revolute joint, a prismatic joint, a universal joint, a spherical joint, and a fixed joint.

14. The reconfigurable machining system of claim 10, wherein the actuators are configured to move the arms with respect to five unique degrees of freedom.

* * * * *